June 30, 1942. G. O. TUTTLE 2,288,377
COVER PLATE FOR ELECTRICAL OUTLET BOXES
Filed Jan. 28, 1941
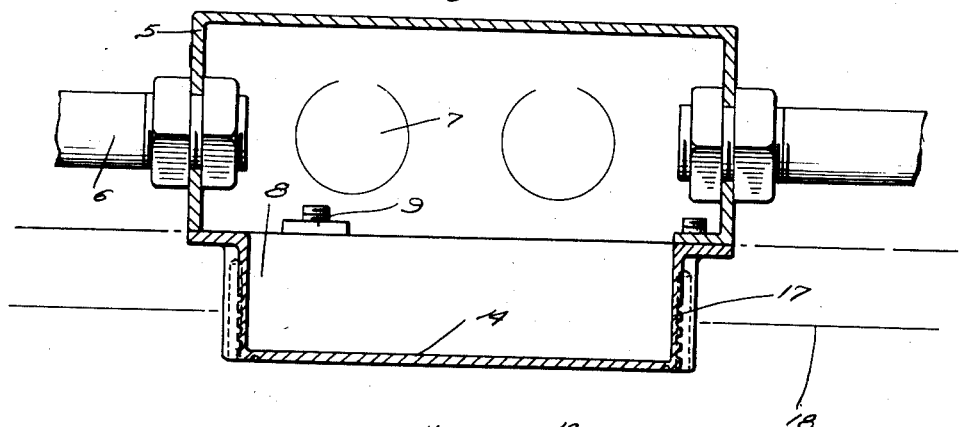
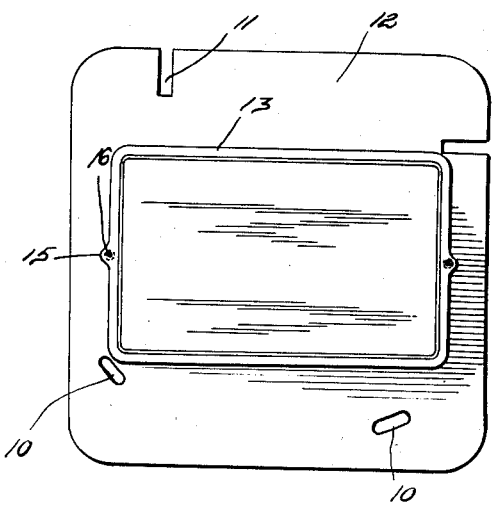
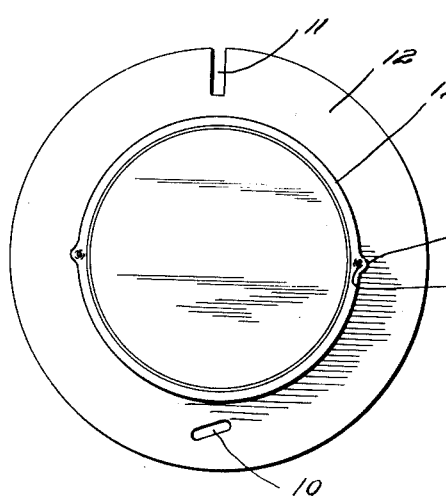
Inventor
George O. Tuttle
By Clarence A. O'Brien
Attorney Patented June 30, 1942

2,288,377

UNITED STATES PATENT OFFICE 2,288,377

COVER PLATE FOR ELECTRICAL OUTLET BOXES

George O. Tuttle, Maywood, Ill.

Application January 28, 1941, Serial No. 376,372

3 Claims. (Cl. 220—3.4)

The present invention relates to new and useful improvements in so-called outlet or junction boxes of electrical house circuits, and has for its primary object to provide a cover construction for the box in the form of a cover plate adapted to protect the interior of the box from plaster and other foreign substances while the walls of a room are being plastered around the box and also to embody means for removing the front wall of the cover plate and the side walls thereof to a depth corresponding to the thickness of the plaster so that the edge of the cover plate will be flush with the surface of the plaster and in which the unsevered portions of the cover plate are adapted for having the finishing plate of the electrical fixture attached thereto, regardless of the proportion of the cover plate severed therefrom.

A still further object is to provide a device of this character of simple and practical construction, which is neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which—

Figure 1 is a longitudinal sectional view through the outlet box showing the cover plate mounted in position thereon.

Figure 2 is a plan view of one form of cover plate for a square-shaped type of outlet box, and Figure 3 is a similar view of a cover plate for a round-shaped type of outlet box.

Referring now to the drawing in detail, the numeral 5 designates an outlet box of conventional construction having the conduit pipes 6 connected thereto at opposite sides, the outlet box being provided with the conventional knockout plugs 7.

One wall of the box is open and adapted for receiving a cover plate designated generally at 8 which is secured in position thereto by the usual bolts 9, the cover plate having the usual openings 10 and slots 11 for receiving the bolts.

In the present embodiment of the invention the cover plate is provided with a flange 12 extending around the marginal edges of the cover plate and the central portion of the cover plate is provided with outwardly projecting walls 13 connected at their outer edges by a front wall 14.

Two of the opposed walls 13 are provided with ribs 15 which project outwardly from the flanges 12, the ribs being tapped to provide threaded openings 16 extending throughout the greater portion of the depth of the walls 13.

The outer surface of the walls 13 are provided with a plurality of spaced grooves or channels 17 extending circumferentially around the walls, the grooves providing weakened portions to provide means for severing the walls at a desired point by means of a suitable tool to remove the outer wall 14 and a desired portion of the walls 13 so that the edge of the cover plate will occupy a position flush with the plaster line 18 after the plaster has been placed on the wall in which the outlet box is mounted.

The threaded openings 16 of the ribs 15 then provide means for attaching the conventional finishing plate for the electric fixture which is attached to the cover plate of the outlet box in a manner well known in the art.

It is believed the details of construction, manner of use and advantages of the device will be readily understood from the foregoing without further detailed explanation.

Having thus described the invention, what I claim is:

1. A cover plate for outlet boxes including a flange adapted for attaching to the box, an outwardly projecting continuous wall at the central portion of the plate and connected to the flange inwardly of the marginal edges of the latter, a front wall connecting the outer edges of said first-named wall, said front wall providing a closure for the central portion of the plate, said first-named wall having spaced circumferentially extending grooves forming weakened portions therein for severing along a predetermined line to remove the front wall.

2. A cover plate for outlet boxes including a flange adapted for attaching to the box, an outwardly projecting continuous wall at the central portion of the plate and connected to the flange inwardly of the marginal edges of the latter, a front wall connecting the outer edges of said first-named wall, said front wall providing a closure for the central portion of the plate, ribs on said first-named wall extending in the plane thereof, said ribs having threaded openings longitudinally of the ribs, and means for severing the first-named wall and the ribs along a predetermined circumferential line to remove the front wall.

3. A cover plate for outlet boxes comprising an attaching flange, a front wall disposed in a plane spaced outwardly in parallelism from the plane of the flange, a continuous wall connecting the front wall to the flange inwardly of the marginal edges of the latter, spaced circumferential grooves on the continuous wall forming weakened portions therein for severing along a predetermined line to remove the front wall, and ribs on the continuous wall transversely of the grooves and having threaded openings longitudinally therein for receiving attaching screws for a finishing plate to be secured to the outer edge of the continuous wall after the front wall has been removed, said rib being severed flush with the unsevered portion of the continuous wall.

GEORGE O. TUTTLE.